Patented Jan. 14, 1947

2,414,407

UNITED STATES PATENT OFFICE 2,414,407

STABILIZED N-VINYL PYRROLE COMPOUNDS

Werner Freudenberg, Cranford, N. J., assignor to General Aniline & Film Corporation, New York, N. Y., a corporation of Delaware No Drawing. Application November 30, 1944, Serial No. 566,026

3 Claims. (Cl. 260—315)

The present invention relates to polymerizable N-vinyl compounds.

Polymeric N-vinyl compounds of the type disclosed in United States Patent No. 2,072,465 to Reppe et al., which may be obtained by polymerizing N-vinyl compounds, such as N-vinyl pyrrole, or N-vinyl compounds containing the pyrrole ring, such as N-vinyl carbazole, N-vinyl tetrahydrocarbazole, N-vinyl propylcarbazole, N-vinyl indole and N-vinyl naphthocarbazole, which, in turn, may be produced in the manner disclosed in United States Patent No. 2,066,160, to Reppe et al., have many unique and valuable properties which render them quite useful in numerous arts. These polymers are particularly useful in the electrical field as low loss insulation material since the polymeric N-vinyl compounds have excellent electrical properties, such as very high resistance and low power factor, and they retain these good electrical properties up to high temperatures. In addition, these polymeric N-vinyl compounds possess unusually high melting or softening points so that they may be used at higher temperatures than is possible with most other polymeric or resinous compounds. However, this high melting or softening point which is particularly valuable in polymeric N-vinyl compounds, at times, renders their use quite difficult and actually prevents their use in certain applications, since this high melting point makes it very difficult to apply the polymer where it is necessary to employ a fluid material.

An illustration of an instance in which the application of a polymeric N-vinyl compound is quite difficult is the impregnation of porous materials, for instance, paper. In impregnating such porous materials, it is desirable to use a relatively fluid impregnant in order to ensure thorough impregnation. However, in the case of polymeric N-vinyl compounds, such as polyvinyl carbazole, it is impossible to sufficiently soften the polymer by heat alone in order to satisfactorily impregnate many materials. The use of various plasticizers for lowering the softening point of the polymeric N-vinyl compound is not always desirable, since frequently, the high softening point is a desirable property of the polymer. While, at times, this difficulty can be overcome, for instance, in some impregnation operations, by the use of a fluid solution of a polymeric N-vinyl compound in a volatile solvent therefor, the use of such solutions is economically disadvantageous, since considerable expense is encountered in dissolving the polymer and in evaporation, recovery and possible loss of the solvent. In addition, in some applications, the use of a solvent may be undesirable for any of a number of reasons; for instance, the type of deposit remaining after removal of the solvent may be insufficiently dense to be acceptable, or it may be difficult to completely remove the solvent.

In accordance with the present invention, the above-mentioned difficulties are overcome where the monomeric N-vinyl compound is to be polymerized in situ, as in the case of the impregnation of porous materials and in many other applications of polymeric N-vinyl compounds, by impregnating the material with the monomeric N-vinyl compound at a temperature slightly above the melting point of the monomer. These monomers have relatively low melting points, vinyl carbazole, for instance, melts at 66–68° C., and flow freely. The monomer impregnated material may then be heated in order to polymerize the monomeric N-vinyl compound in situ. Considerable difficulties are encountered, however, in this type of operation since rapid polymerization of the monomeric N-vinyl compounds takes place at temperatures only slightly above their melting point. In fact, a certain amount of polymerization occurs on standing at room temperature. The result is that, in many instances, when it is attempted to employ the molten monomer, polymerization is so rapid that satisfactory results are difficult, if not impossible, to obtain.

The difficulties caused by the rapid polymerization of the molten monomer can be overcome by the use of known polymerization inhibitors for the N-vinyl compounds. Such known inhibitors are alkalies of various types and hydroxy organic compounds, particularly aliphatic hydroxy compounds. But while such known inhibitors prevent too rapid a polymerization, their use is objectionable since when they are employed in an effective amount, they not only inhibit the polymerization at temperatures slightly above the melting point of the monomer but also exert a strong polymerization inhibiting action at substantially higher temperatures, and frequently have an adverse effect on the properties of the polymer which is obtained.

It is, therefore, an object of the present invention to provide a polymerizable N-vinyl compound containing an inhibitor which will effectively inhibit the polymerization of the monomer at a temperature slightly above the melting point of the monomer but which, at a slightly higher temperature, has relatively little inhibiting effect and permits the polymerization to proceed rapidly and has no adverse effect on electrical properties.

Other and further objects will be apparent as the present description progresses.

I have found that when a small amount, up to a few percent, of morpholine is incorporated in a monomeric N-vinyl compound, it exerts a strong polymerization inhibiting action at temperatures between the melting point of the monomer up to about 100° C. However, at slightly higher and readily obtainable temperatures, such as 120° C., its inhibiting effect is sufficiently reduced that complete polymerization by heat may be effected in a practical period of time. In addition, I have found that the polymers produced by heating monomeric N-vinyl compounds, containing a small amount of morpholine, to a temperature at which the morpholine is no longer effective as an inhibitor, retain all of the desirable properties of the polymers produced from the uninhibited monomers and, in fact, a slight improvement in certain of the properties, such as the power factor of the polymer, is noticeable. It will also be noted that the use of the monomer in an impregnation operation is quite economical since no problems of solvent recovery and the like are presented and the cost of impregnating a particular article with monomer, followed by polymerization of the monomer, frequently is no greater than the cost of the impregnation or polymerization operation alone.

Relatively minor amounts of morpholine are effective as an inhibitor. Thus, the incorporation of 0.01% morpholine in N-vinyl carbazole monomer effectively inhibits the polymerization of the monomer at a temperature of 100° C. for a period of at least 24 hours. Larger amounts, up to 1% or slightly higher are effective for inhibiting polymerization at temperatures above the melting point of the monomer up to 100° C. and exert no adverse effect on the polymer produced by heating the inhibited monomer to slightly higher temperatures, such as 120° C. For practical purposes, a monomeric N-vinyl compound can be considered to be effectively inhibited when no noticeable change in viscosity occurs when the monomeric compound is heated to 100° C. for 20 to 24 hours. I have found that monomer containing less than 1% of polymer is practically unchanged in viscosity at 100° C. and the monomer can be considered to be effectively inhibited.

In practicing the present invention, the morpholine is mixed with the monomer in the amounts specified above. This mixing may be effected conveniently by mere thorough mechanical mixing of the inhibitor and monomer. If desired, the inhibitor may be added to the molten monomer, or the monomer may be melted after the inhibitor has been added, in either case, if the monomer is not to be used promptly, it may be allowed to cool and crystallize and then ground up. Still another method of mixing the inhibitor with the monomer is to add the inhibitor to a solution of the monomer in a low boiling solvent, such as methylene dichloride or cyclohexane, and evaporate off the solvent at a temperature below that at which polymerization occurs, using a vacuum if necessary. Care should be exercised in selecting the solvent and evaporating it in order that the inhibitor will not be vaporized and removed. Various other methods for incorporating the inhibitor in the monomer will suggest themselves to those skilled in the art and may be employed if desired.

The mixture of monomer containing from 0.01% to 1% morpholine is then melted by heating to a temperature above the melting point of the monomer, but preferably not exceeding 100° C. The molten mixture is quite fluid and may then be used in any desired manner, for instance, the molten monomer containing the inhibitor may be applied as a liquid coating to a porous material or porous articles may be dipped in the molten bath or the molten material may be flowed into a mold. It should be understood that until the molten material has been applied to whatever material or use is intended for it, the temperature should not exceed 100° C. Once the molten monomer has been satisfactorily applied, it is then heated to a temperature of at least 110° C. and preferably 120° C. or higher. At this temperature, the inhibitor is no longer effective for preventing polymerization. This elevated temperature is then maintained until the desired degree of polymerization has occurred. The exact temperature of heating and time for effecting the polymerization will depend somewhat on the particular use to which the molten monomer is applied. At temperatures above 100° C., it has been found that each 10° C. rise reduces the time necessary for complete polymerization by roughly 50%. By complete polymerization, I mean the formation of a hard infusible resin. Thus, at a temperature of about 110° C., approximately 20 to 24 hours is required for complete polymerization, while at a temperature of 120° C., complete polymerization is effected in 10 to 12 hours. At higher temperatures the polymerization is even more rapid and at 150° C., the polymerization is completed in less than one hour. However, I have found that slightly better results are generally obtained when the polymerization is carried out under longer periods, at least 3 to 6 hours, as compared with short, high heating, and therefore in the preferred method of practicing the present invention, I heat the inhibited monomer to a temperature in the range of 120–130° C. for a sufficient time to effect complete polymerization. This will vary from 10 to 12 hours at 120° C. to 5 to 6 hours at 130° C. On completion of such heating, the polymer is a hard infusible resin and articles produced therefrom are ready for use.

In order to fully illustrate the present invention, there are given below, in tabular form, a number of specific examples illustrating the effect of varying amounts of morpholine on the polymerization of N-vinyl carbazole monomer. In making the tests given below in Table II, powdered vinyl carbazole was charged in a Pyrex test tube. The tube was evacuated to less than 1 mm. mercury and the vacuum broken with nitrogen. The purging by evacuation and nitrogen displacement was repeated two more times and the tube then placed in a constant temperature bath, maintained at the temperature noted in the table. After the time stated in the table, the samples were withdrawn and the molten product poured into methanol. The material remaining in the tube was extracted with hot methanol which was separated from the insoluble polymer. The remaining polymer was dissolved in benzene and finally precipitated by means of methanol. The polymer was filtered and dried at 80° C.

Table I

| Sample of monomer | Experiment | Percent of morpholine | Time of heating, hours | Temp. to which sample was heated, °C. | Percent of polymer formed |
|---|---|---|---|---|---|
| A | 1 | None | 20 | 100 | 12.1 |
| A | 2 | None | 6 | 100 | 3.05 |
| A | 3 | None | 2 | 120 | Complete |
| A | 4 | 0.09 | 72 | 100 | .7 |
| A | 5 | .09 | 12 | 120–125 | Complete |
| B | 6 | None | 24 | 100 | 9.4 |
| B | 7 | .02 | 17 | 100 | .6 |
| B | 8 | .08 | 24 | 100 | .2 |
| C | 9 | .01 | 20 | 100 | .3 |
| C | 10 | .04 | 20 | 100 | .2 |
| C | 11 | .1 | 20 | 100 | Trace |

It will be noted from a comparison of the results tabulated above that some slight differences occur due to the differences in activity of different batches of monomer. Such variations, in general, however are relatively slight and it will be noted that from 0.01 to 0.1% of morpholine actively inhibited polymerization for periods up to 72 hours. As previously stated, I have found that when less than 1% of polymer is formed, the molten monomer remains sufficiently fluid for practical use. It should be noted that samples corresponding to those used in experiments 7 to 11, inclusive, of the above table, when heated to a temperature of 120° C. for 12 hours were completely polymerized.

As previously stated, the presence of morpholine has no adverse effect on the electrical properties of the polymer formed and, in fact, results in some slight improvement of these properties. This is evidenced by the comparative power factors obtained with uninhibited and inhibited samples of polyvinyl carbazole given at Table II below.

Table II

| Experiment No. | Morpholine | Power factor room temp. | Power factor 100° C. |
|---|---|---|---|
| | Per cent | Per cent | Per cent |
| 1 | 0.0 | 0.08 | 0.11 |
| 2 | .25 | .06 | .06 |
| 3 | .2 | .06 | .07 |
| 4 | 1.0 | .06 | .06 |

I claim:

1. A heat polymerizable N-vinyl pyrrole composition which is stabilized towards polymerization at temperatures below 100° C. but above its melting point, which comprises an N-vinyl pyrrole compound containing a minor amount, up to a few percent, of morpholine.

2. A heat polymerizable N-vinyl carbazole composition which is stabilized towards polymerization at temperatures below 100° C. but above its melting point, which comprises N-vinyl carbazole containing a minor amount, up to a few percent, of morpholine.

3. A heat polymerizable N-vinyl carbazole composition which is stabilized towards polymerization at temperatures below 100° C. but above its melting point, which comprises N-vinyl carbazole containing from 0.1 to 1.0% morpholine.

WERNER FREUDENBERG.